Figure 1:
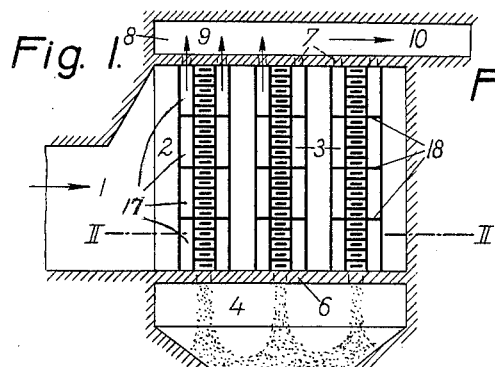

Nov. 4, 1952     E. FEIFEL ET AL     2,616,520
MULTIPLE CENTRIFUGAL SEPARATORS CONNECTED IN PARALLEL
Filed March 1, 1949     2 SHEETS—SHEET 1

Fig. 10.
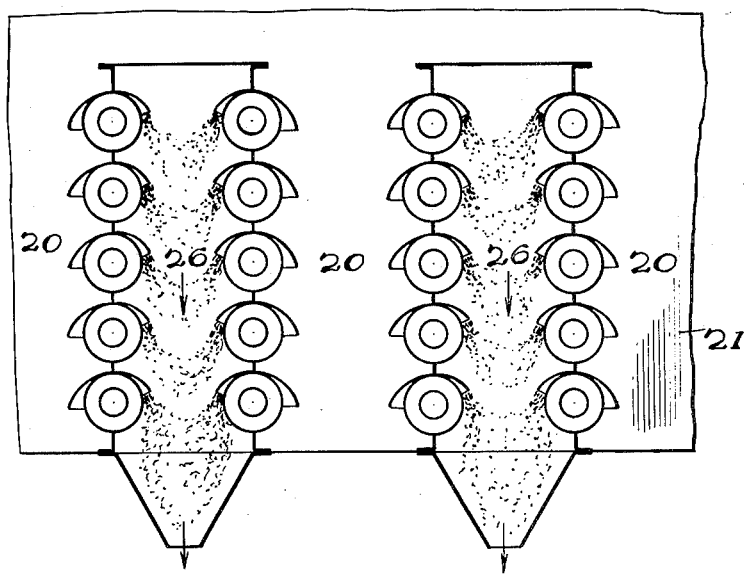
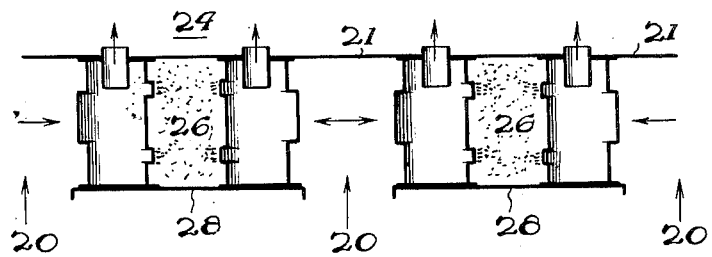
Fig. 9.

Patented Nov. 4, 1952

2,616,520

UNITED STATES PATENT OFFICE 2,616,520

MULTIPLE CENTRIFUGAL SEPARATORS CONNECTED IN PARALLEL

Eugen Feifel and Roland Kemmetmüller, Vienna, Austria, assignors to Waagner-Biro Aktiengesellschaft, Vienna, Austria, a joint-stock company of Austria Application March 1, 1949, Serial No. 79,006
In Austria March 4, 1948

4 Claims. (Cl. 183—80)

The invention relates to groups of centrifugal separators with cyclone cells connected in parallel for the separation of solid and liquid admixtures from gases or vapors. It has already been proposed to construct such groups of centrifugal separators in such a manner that the individual cyclones are arranged between parallel walls separating the collecting chambers for the pure gas and from the chambers for the eliminated particles and from the chambers for the crude gas. Said constructions have been developed principally for metallic cyclone cells, which have a vertical cyclone axis between horizontal plate walls, or a horizontal cyclone axis between vertical plate walls, said walls themselves constituting a part of the walls of a crude gas distributing chamber. Said constructions have above all the drawback that with an increasing number of cells the access to the individual cells for testing, overhauling, or renewing, is rendered more difficult. This drawback is removed by the present invention, and moreover thereby is obtained the advantage of a more simple manner of construction is attained. The present invention essentially consists in a plurality of cyclones set column like or pilaster like one upon the other. The columns or pilasters may be arranged next to one another in the crude gas distributing chamber, the columns being completely accessible from all sides, the pilasters, however, freely accessible only with the greater part of their surface, in view of the fact that they are partly engaged in a wall.

The axes of the cyclone cells combined in columns or pilasters are placed parallel or transverse to the axis of the respective column or pilaster, the gas channels in the columns or pilasters extending, however, substantially parallel to the axis of the column or pilaster. The cyclones of any desired, preferably cylindrical, shape may completely or partly consist of metallic or non-metallic materials. The walls of the gas channels within the columns or pilasters, and likewise the walls of the crude gas distributing chamber are completely or partly metallic or non-metallic. The cross-section of the channels in the columns or pilasters corresponds to the speed of gas flow desired, the shape of the cross-section to the outline (e. g. square, circle, drop shape) of the cross-section desired of the column or pilaster.

Groups of centrifugal separators according to the invention are, because of the freedom of choice as to the column or pilaster height, and as to the plan of grouping the columns or pilasters, extraordinarily adaptable to given space conditions. The designer has likewise a wide choice of building materials suitable for the cyclone, for the columns or pilasters, and for the walls of the crude gas distributing chamber. The easily maintained accessibility from the side to every column or pilaster, and to every cyclone cell quite materially increases the possibility of attendance, and thus the reliability of operation of the whole group of separators.

For the delivery and for the installation the individual columns or pilasters are suitably formed by two or several blocks, any one of which contains several cyclones set one upon the other. These blocks of a suitable axial length are piled up one upon the other on the spot, and joined together gas tightly by means known per se. Besides the cyclones columns or pilasters, or their blocks may likewise contain other gas distributing channels required for the separation process.

Figure 5:
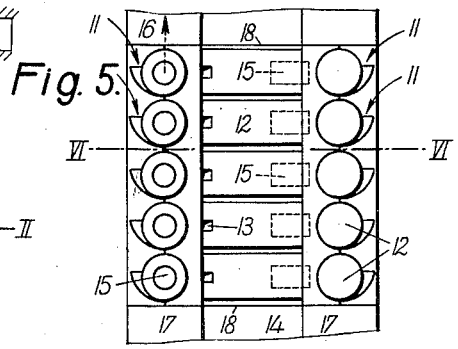
Figure 2:
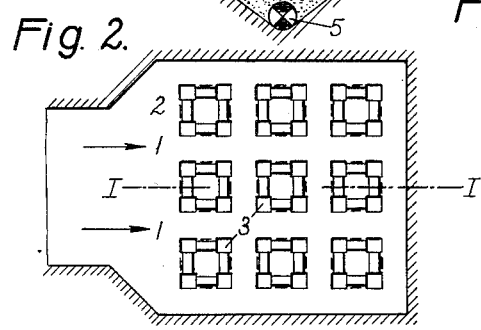
Figure 6:
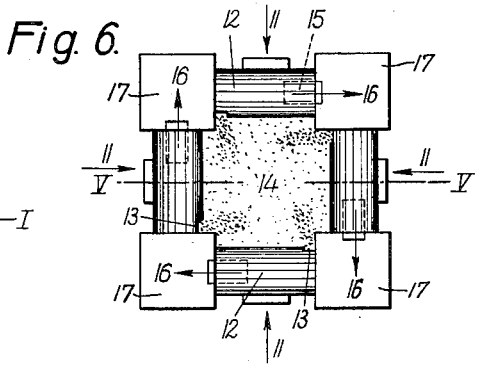
Figure 3:
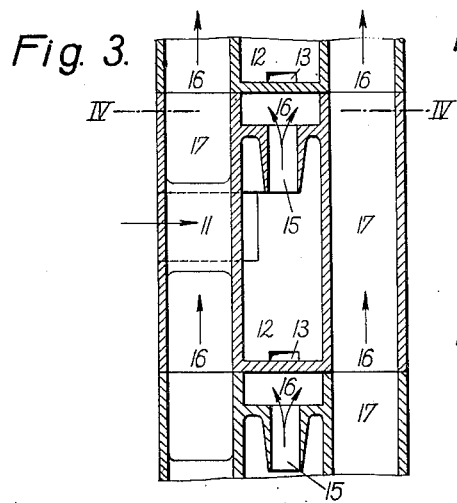
Figure 7:
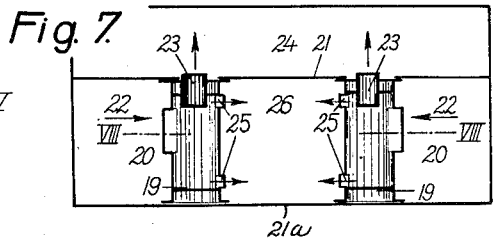
Figure 4:
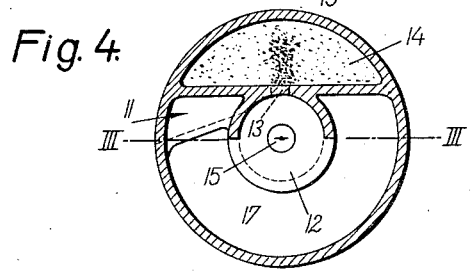
Figure 8:
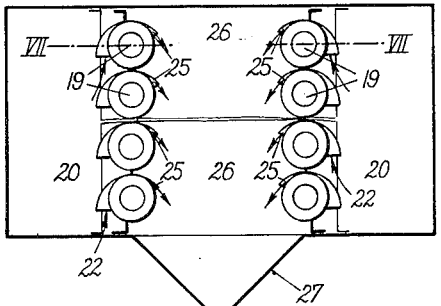

Some embodiments of the invention are schematically shown by way of example in the accompanying drawing, in which Fig. 1 is a cross-section of the whole installation on line I—I of Fig. 2, Fig. 2 is a section on line II—II of Fig. 1, Fig. 3 is a cylindrical column, e. g. made of cast iron or of ceramics, in a section according to line III—III of Fig. 4, Fig. 4 a section on line IV—IV of Fig. 3, Fig. 5 a square column in section on line V—V of Fig. 6, as shown in Fig. 1, Fig. 6 a section on line VI—VI of Fig. 5, Fig. 7 a horizontal section of a modified embodiment, on line VII—VII, of Fig. 8, and Fig. 8 a vertical section on line VIII—VIII of Fig. 7. Fig. 9 is another modification in top plan and Fig. 10 is a vertical section thereof.

Like reference characters denote like parts in the several embodiments of the drawing.

The dust laden gases flowing in the direction of the arrows 1 arrive in the cubiform chamber 2, in which a number of free-standing columns 3 is arranged, any one of said columns containing several centrifugal separators connected in parallel. Underneath the chamber 2 the dust collecting bunker 4 is arranged, into which the separate dust leaving the columns 3 drops down, and from which it is removed by a worm conveyor 5 or by some other discharging device.

The ceiling 6 of the dust collecting bunker 4 constitutes the bottom of the crude gas distributing chamber 2 in which the columns 3 are arranged in spaced relation, the ceiling 7 of said chamber constituting the bottom of the pure gas collecting chamber 8, into which the gases leaving the columns 3 and freed from the solid admixtures flow in the direction of the arrows 9, to continue flowing in the direction of the arrow 10 towards the chimney or to some other place for further utilization.

In Figs. 3 and 4, and in Figs. 5 and 6, respectively, there are shown two different embodiments, i. e. in the columns according to Figs. 3 and 4 simple cells with a vertical cyclone axis are piled one upon the other, resulting, together with the gas channels, in a cylindrical contour of the columns. However, in Figs. 5 and 6 four cells, each, with a horizontal cyclone axis are arranged in the square cross-sections of the columns. The mode of operation in both cases is as follows:

The gas to be purified enters tangentially, in the direction of the arrows 11, the individual centrifugal chambers 12 from the crude gas distributing chamber 2. The dust thus centrifugally separated enters the dust collecting channels 14 through the discharge openings 13 of the wall of the centrifugal chamber, said channels leading into the dust collecting bunker 4, and being closed at the top against the pure gas collecting chamber 8. The purified gas leaves the individual centrifugal chambers 12 through the outlets 15 according to the arrows 16, comes into the channels 17, being closed below and open above towards the pure gas collecting chamber 8, and finally into the collecting chamber 8 in the direction of the arrows 9 of Fig. 1.

The columns extending, according to Fig. 1, between the bottom and the ceiling 7 of the crude gas distributing chamber 2 are in the embodiment subdivided by three partitions 18 into four blocks, each of which (Figs. 5 and 6) on everyone of its four lateral faces contains five cells, each, arranged one upon the other, so that the whole group of separtors shown in Fig. 1 is comprised of 720 cyclones.

The cross-section required of the columns is restricted to a minimum extent by the cyclone cells and the gas distributing chanels of the individual columns directly adjoining one another with partly mutual walls. Thus e. g. the wall of the cyclone 12 constitutes, according to Fig. 4, also a part of the wall of the pure gas collecting chamber 17 and of the dust collecting channel 14; likewise the cyclones 12 of the columns according to Figs. 5 and 6 constitute at the same time the separating wall between the crude gas distributing chamber 2 and the dust collecting channel 14.

According to the local conditions the pure gas collecting chamber may be situated above the crude gas distributing chamber or laterally next to it, in the first case the columns may suitably stand completely free in the crude gas distributing chamber (Figs. 1, 2), and in the latter case suitably engage pilaster like with one part of their surface the separating wall between the crude gas distributing chamber and the pure gas collecting chamber, so that the accessibility to the cyclones is at any rate preserved.

The pilaster like arrangement of the cyclones may be made in a manner similar to the embodiment according to Fig. 6 and may comprise two or more columns of cyclones placed one upon the other, the gas discharge tubes of said cyclones opening through the separating wall into the common pure gas chamber, and a channel leading to the common dust collectng chamber being situated between said cyclones. Such an embodiment is shown by way of example in Figs. 7 and 8, the cyclones 19 being arranged in the crude gas chamber 20 with horizontal axes in pairs next to each other, and in any number desired one upon the other along and engaging the wall 21, thus forming pilasters. The wall 21 separates the crude gas chamber 20 from the pure gas chamber 24. The crude gas enters the cyclones from the chamber 20 according to the arrows 22, and the pure gas is flowing through the discharge tubes 23 into the pure gas chamber 24. The dust separated in the cyclones falls through the outlet 25 into the vertical dust collecting channel 26, and through the funnel 27 into the bunker.

In the modification of Figs. 9 and 10 two pairs of spaced cyclone columns are in spaced relation, the space between the column pairs constituting part of the crude gas chamber, and are secured at corresponding ends to the wall 21 separating the crude gas chamber from the pure gas chamber. The other corresponding ends of a pair of columns are attached to a wall 28 enclosing with the two columns and part of wall 21 the dust chamber 26.

The closely engaging relation of the cyclones claimed in the appended claims may be direct or indirect.

While the invention has been shown in the particular embodiment described it is not limited thereto, as modifications thereof may be made without departing from the scope of the appended claims.

We claim:

1. In a centrifugal dust separator plant the combination comprising at least a pair of spaced vertical columns composed of a plurality of cylindrical cyclones having their axes disposed substantially; horizontally and each disposed in gastight relation to an adjacent cyclone, each cyclone column on one side partly enclosing a crude gas chamber and on the other side partly enclosing a dust chamber, a vertical wall partly enclosing the crude gas chamber and partly enclosing a pure gas chamber and connected to corresponding ends of at least a pair of spaced cyclone columns, a second wall connected to the other corresponding ends of the pair of cyclone columns and partly enclosing the dust chamber, the cyclones including casings provided with crude gas inlets opening into the crude gas chamber and with dust outlets opening into the dust chamber and provided with pure gas outlets opening into the pure gas chamber, a substantially; horizontal gastight wall closing the upper end of the dust chamber, and a dust collecting funnel connected to the lower end of the dust chamber by a gastight joint.

2. The separator plant according to claim 1 and wherein the crude gas inlets and dust outlets are respectively on opposite sides of a cyclone.

3. The separator plan according to claim 1 and wherein the cyclones of the same column are each spaced from an adjacent cyclone and auxiliary walls connect the casings in a gastight manner.

4. The plant according to claim 1 and wherein the diameter of each cyclone is susbtantially the same throughout the length thereof.

EUGEN FEIFEL.
ROLAND KEMMETMÜLLER.

REFERENCES CITED

The following references are of record in the file of this patent:

UNITED STATES PATENTS

| Number | Name | Date |
| --- | --- | --- |
| 2,201,301 | Richardson | May 21, 1940 |
| 2,205,966 | Van Tongeren | June 25, 1940 |
| 2,262,860 | Roe | Nov. 18, 1941 |
| 2,348,785 | Bullock | May 16, 1944 |

FOREIGN PATENTS

| Number | Country | Date |
| --- | --- | --- |
| 328,653 | Great Britain | May 2, 1930 |
| 580,936 | Great Britain | Sept. 25, 1946 |
| 880,715 | France | Jan. 6, 1943 |
| 891,452 | France | Dec. 11, 1943 |
| 67,996 | Denmark | Nov. 8, 1948 |